(No Model.)

H. KLEMAN.
NUT LOCK.

No. 411,125. Patented Sept. 17, 1889.

WITNESSES
T. W. Bakewell
W. B. Corwin

INVENTOR.
Henry Kleman

UNITED STATES PATENT OFFICE.

HENRY KLEMAN, OF PITTSBURG, PENNSYLVANIA.

NUT-LOCK.

SPECIFICATION forming part of Letters Patent No. 411,125, dated September 17, 1889.

Application filed December 26, 1888. Serial No. 294,581. (No model.)

*To all whom it may concern:*

Be it known that I, HENRY KLEMAN, of Pittsburg, in the county of Allegheny and State of Pennsylvania, have invented a new and useful Improvement in Nut-Locks, of which the following is a full, clear, and exact description, reference being had to the accompanying drawings, forming part of this specification, in which—

Figure 1:
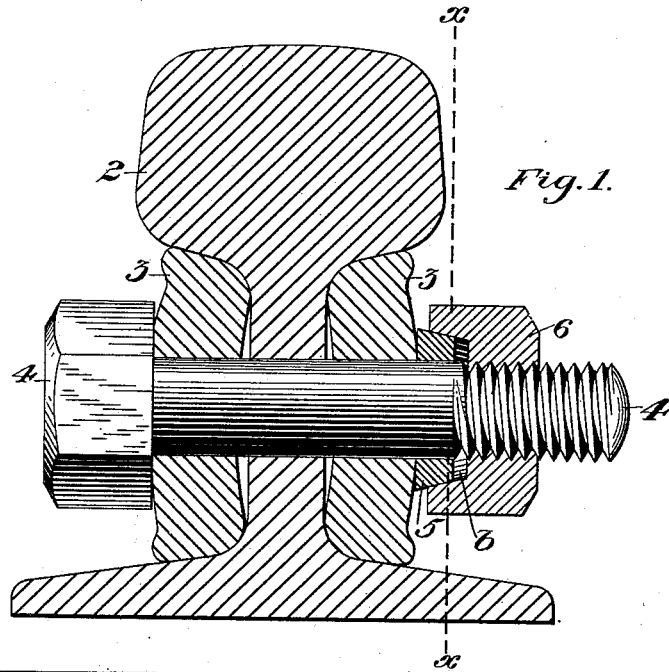
Figure 2:
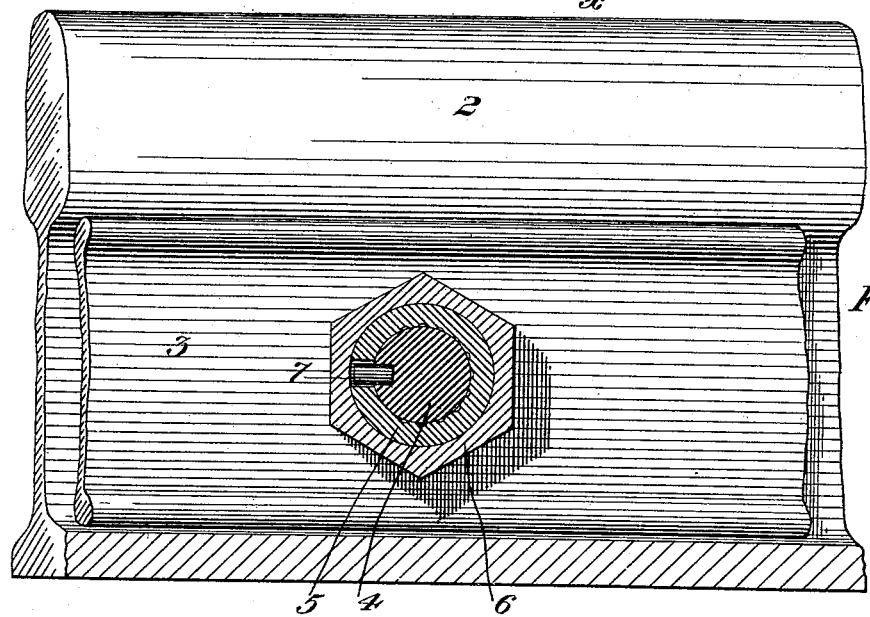
Figure 3:
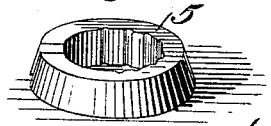

Figure 1 is a vertical cross-section of a railroad-rail provided with my improved nut-lock. Fig. 2 is a sectional elevation thereof, the section being on the line $x\ x$ of Fig. 1. Fig. 3 is a perspective view of the locking-washer.

Like symbols of reference indicate like parts in each.

In the drawings, 2 is the rail. 3 are the usual splice-bars or fish-plates, and 4 is the headed bolt, which extends through the splice-bars and the web of the rail.

5 is a divided annular washer, whose external shape is that of the frustum of a cone and whose inner periphery is preferably corrugated, as shown in Figs. 2 and 3.

6 is the nut, which is of the usual construction, except that on its inner face it is provided with a countersunk conical cavity $b$, surrounding the threaded eye of the nut, which is adapted to receive the smaller side of the washer 5, but is so related in size thereto that the washer cannot be forced entirely into the cavity $b$, but shall project therefrom, as shown in Fig. 1.

In applying the nut-lock to use the washer 5 is put on the bolt against the side of the fish-plate, a pin 7 is put between the divided ends of the washer into a hole made for that purpose in the bolt, and the nut is screwed home upon the bolt until its countersunk cavity $b$ encircles the washer, as shown in Fig. 1. Further tightening of the nut will compress the washer tightly around the bolt, and will press it against the side of the fish-plate, and cause the nut to jam or lock on the washer, as will be readily understood. The nut itself does not bear on the fish-plate, and as the outer face of the washer does not extend to the base of the cavity $b$ space is allowed for expansion and contraction of the bolt. The bearing against the plate is taken entirely by the washer, and as this is divided it will yield, so as to fit evenly against the plate and to afford a perfect bearing even though the plate be irregular in shape, whereas if the nut should be allowed to bear against the plate such evenness of bearing is not always attainable.

The washer is prevented from turning by means of the pin or projection 7. This pin is not indispensable, but it is a valuable addition to the lock.

The advantages of my improvement consist in its simplicity, its effectiveness, its allowing for expansion of the bolt, and its cheapness of cost of manufacture.

I claim—

1. An improvement in nut-locks, consisting in the combination of the plate, the bolt, the nut having a countersunk cavity on its inner face, and an annular tapering divided washer encircling the bolt and fitting within the countersunk cavity, the said washer being made of sufficient depth that when the nut is tightened on the bolt the washer shall project from the cavity and shall bear against the plate, substantially as and for the purposes described.

2. An improvement in nut-locks, consisting in the combination of the plate, the bolt, the nut having a countersunk cavity on its inner face, and an annular internally-corrugated tapering divided washer encircling the bolt and fitting within the countersunk cavity of the nut and bearing on the plate, substantially as and for the purposes described.

3. An improvement in nut-locks, consisting in the combination of the bolt, the nut having a countersunk cavity on its inner face, a tapering annular divided washer encircling the bolt, fitting within the countersunk cavity, and a pin or projection on the bolt which fits between the divided portions of the washer and prevents turning thereof, substantially as and for the purposes described.

In testimony whereof I have hereunto set my hand this 20th day of December, A. D. 1888.

HENRY KLEMAN.

Witnesses:
THOMAS W. BAKEWELL,
W. B. CORWIN.